United States Patent [19]
Fan

[11] Patent Number: 5,697,071
[45] Date of Patent: Dec. 9, 1997

[54] MOBILE PHONE HOLDER STRUCTURE

[76] Inventor: Eagle Fan, No. 30, Lu-Chang, Chu-Pei City, Hsin-Chu Hsien, Taiwan

[21] Appl. No.: 642,106

[22] Filed: May 2, 1996

[51] Int. Cl.[6] .................................................. H04B 1/38
[52] U.S. Cl. ........................... 455/90; 455/89; 455/95; 220/402; 220/648; 224/197; 224/269
[58] Field of Search ............................... 455/90, 89, 95, 455/347, 348, 349, 351, 100, 128, 346; 361/730, 752, 814; 364/708.01, 708.02, 705.05; 220/4.02, 4.21, 648, 643; 224/686, 197, 269, 666; 24/3.11

[56] References Cited

U.S. PATENT DOCUMENTS

| | | | |
|---|---|---|---|
| 4,207,790 | 6/1980 | Endo | 83/698 |
| 4,803,473 | 2/1989 | Taylor | 340/693 |
| 5,203,021 | 4/1993 | Repplinger et al. | 455/90 |

*Primary Examiner*—Reinhard J. Eisenzopf
*Assistant Examiner*—Darnell R. Armstrong

[57] ABSTRACT

A mobile phone holder includes an upper casing member and a lower casing member, each having an inside surface on which a plurality of parallel-arranged guiding slots are formed. Two clamp members each comprise a flat plate member to which a strip-like section is fixed to be selectively slidably receivable within the slots of the upper and lower casing members. Each of the clamp members has resilient holding sections extending therefrom to define a space for receiving and holding therein a mobile phone. The open end of the casings allows the clamp members to be removed from the casing members and re-inserted into another guiding slot so as to change the distance between the clamp members and thus adapted to hold mobile phones of different sizes.

10 Claims, 5 Drawing Sheets

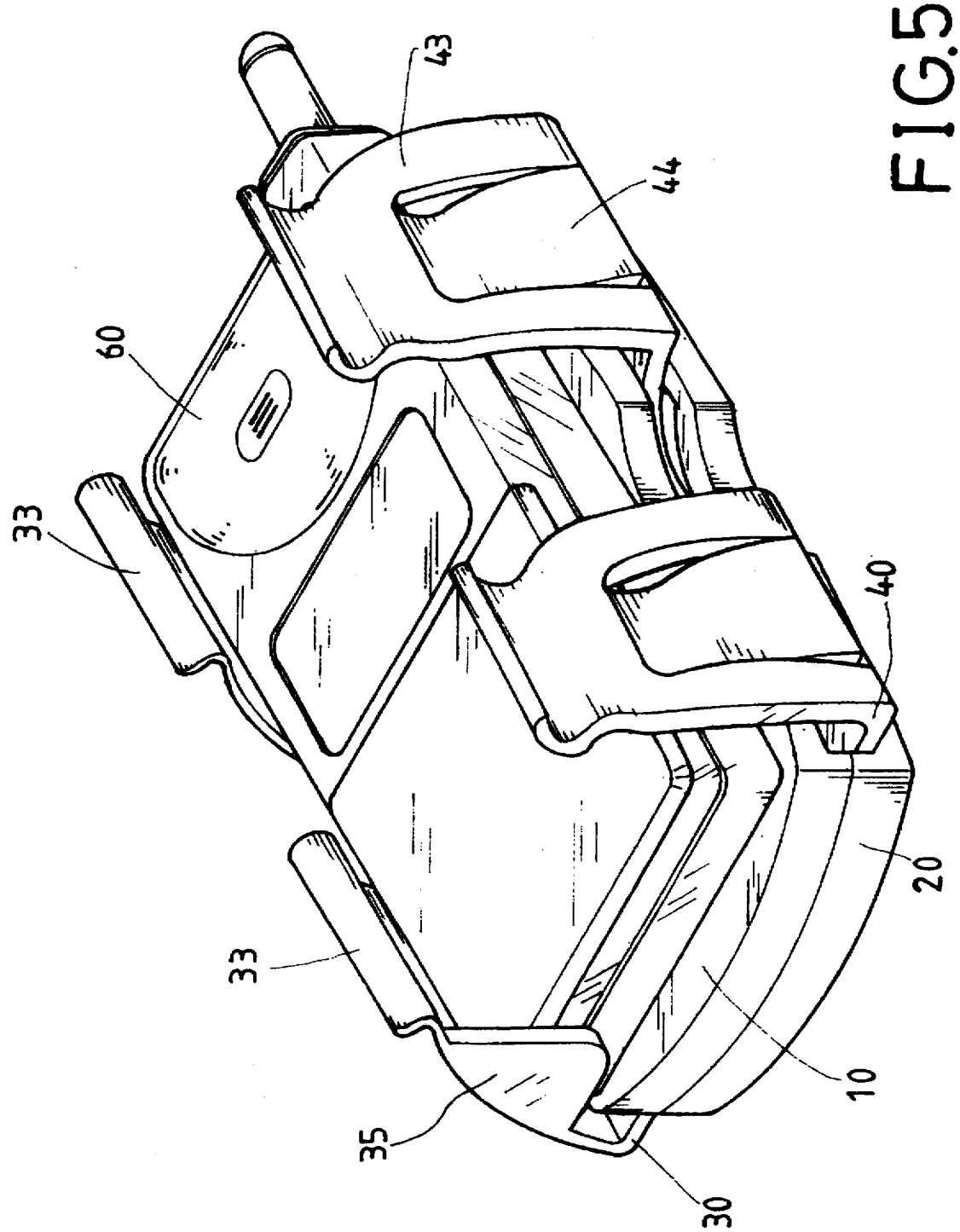

MOBILE PHONE HOLDER STRUCTURE

FIELD OF THE INVENTION

The present invention relates generally to a mobile phone holder and in particular to an adjustable mobile phone holder.

BACKGROUND OF THE INVENTION

Mobile phones have been widely used with increasing popularity as a handy communication means. Due to the miniaturization of the mobile phones, holders have been developed to hold the mobile phone in position when not in use, especially for holding the mobile phone inside a car. The currently available mobile phone holders can be classified into two types, the fixed size type and the size adjustable type. The fixed size type holders can only be used for a specific size or even a particular model of mobile phones and thus several obvious disadvantages are associated therewith. For example, such a fixed size holder can be used with a given size of mobile phone only and for the current market, there are a variety of different models of mobile phones, it is very difficult for the holder manufacturers to make so many kinds of different holders for it needs a substantial facility set up cost and parts inventory. Further, since mobile phones of new models are being developed everyday, mobile phone holders that are not fit for the newly developed mobile phones would soon lose their market competivity.

In addition, the mobile phones are usually powered by rechargeable battery sets which may take different dimensions (thicknesses) for different chemical composition that is filled in the battery sets. In that case, a fixed size holder would not be capable to hold mobile phones of a particular model using different battery sets that are electrically compatible to the given model.

The size adjustable type holders, although being adjustable for holding mobile phones of different sizes and models, require a complicated mechanism to achieve the adjustability. Such a complicated mechanism may sometimes malfunction and needs a substantial manufacturing cost. Further, for the mobile phones that use battery set of great thicknesses, the holding capability of the adjustable holder is reduced.

Thus, it is desirable to have a mobile phone holder that is size adjustable so as to fit for mobile phones of different sizes and that is simple in structure so as to reduce the manufacturing cost and to maintain the holding capability for mobile phones of different sizes.

SUMMARY OF THE INVENTION

It is therefore a primary object of the present invention to provide a mobile phone holder that is size adjustable for holding mobile phones of different sizes (widths).

It is another object of the present invention to provide a mobile phone holder that is simple in structure so as to reduce the chance of malfunction and to cut down the manufacturing cost, increasing the market competivity.

It is a further object of the present invention to provide a mobile phone holder which is provided with two sets of clipping members so as to be fit for mobile phones using battery sets of different sizes, thus having different overall thicknesses.

To achieve the above objects, this invention provides a mobile phone holder comprising an upper casing member and a lower casing member, each having an inside surface on which a plurality of parallel-arranged guiding slots are formed. Two clamp members are provided, each comprising a flat plate member to which a strip-like section is fixed to be selectively slidably receivable within the slots of the upper and lower casing members. Each of the clamp members has resilient holding sections extending therefrom to define a space for receiving and holding therein a mobile phone. The open end of the casings allows the clamp members to be removed from the casing members and re-inserted into another guiding slot so as to change the distance between the clamp members and thus adapted to hold mobile phones of different sizes.

These and other objects and advantages of the present invention will become more apparent from a consideration of the following detailed description of a preferred embodiment, when read in conjunction with the accompanying drawings, wherein:

BRIEF DESCRIPTION OF THE DRAWINGS

FIG. 5 is a perspective view showing a mobile phone held in the mobile phone holder of the present invention.

DETAILED DESCRIPTION OF THE PREFERRED EMBODIMENT

Figure 1:
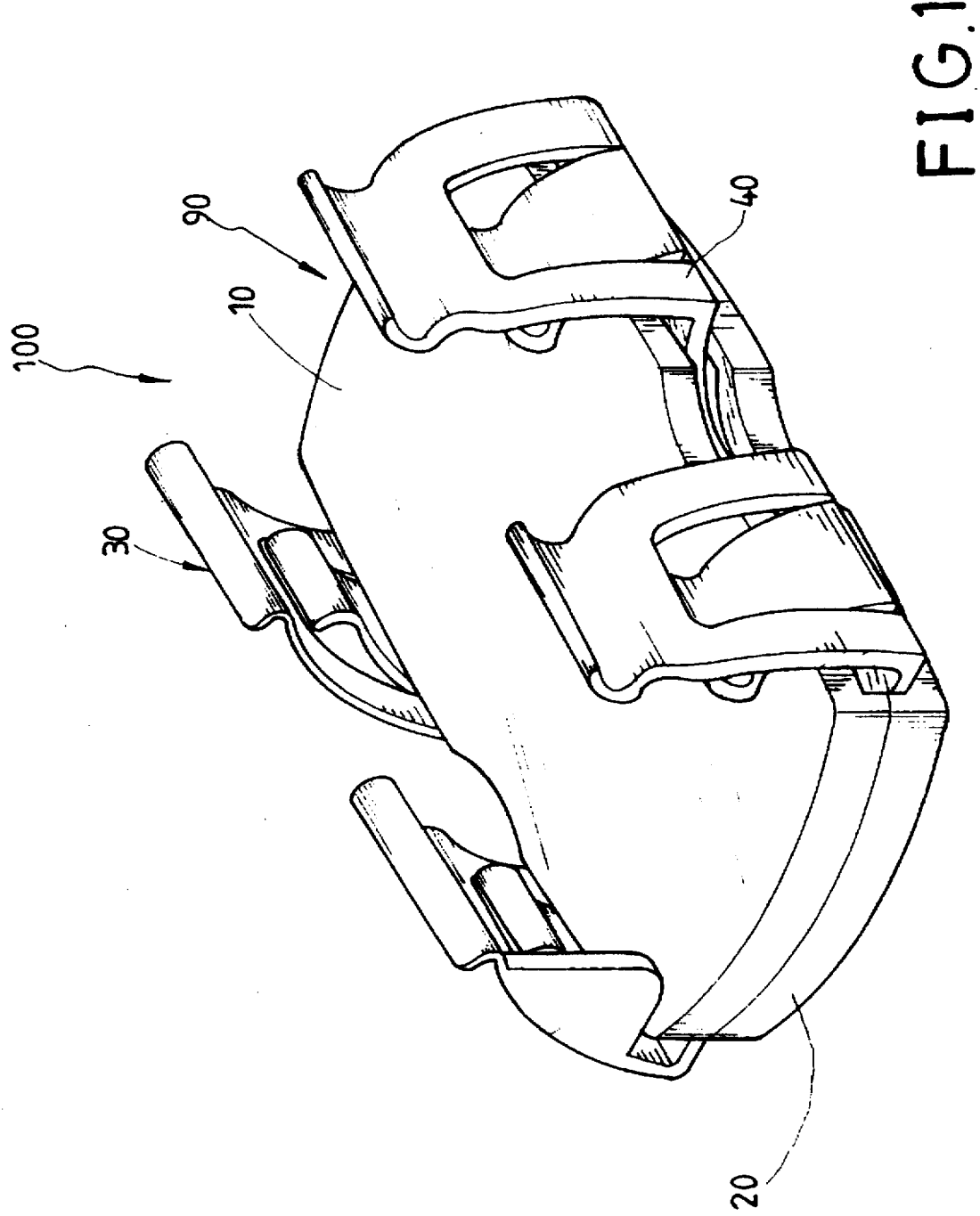
FIG. 1 is a perspective view showing a mobile phone holder constructed in accordance with the present invention.

Referring to FIG. 1, wherein a mobile phone holder constructed in accordance with the present invention, generally designated with the reference numeral 100, is shown, the mobile phone holder 100 comprises a body 90 defined by two longitudinal edges and two lateral edges. The body 90 is constituted by an upper casing member 10 and a lower casing member 20 to which two clamp members 30 and 40 are location-adjustably mounted so as to define therebetween a distance for receiving and holding therein a mobile phone 60 (see FIG. 5).

Figure 2:
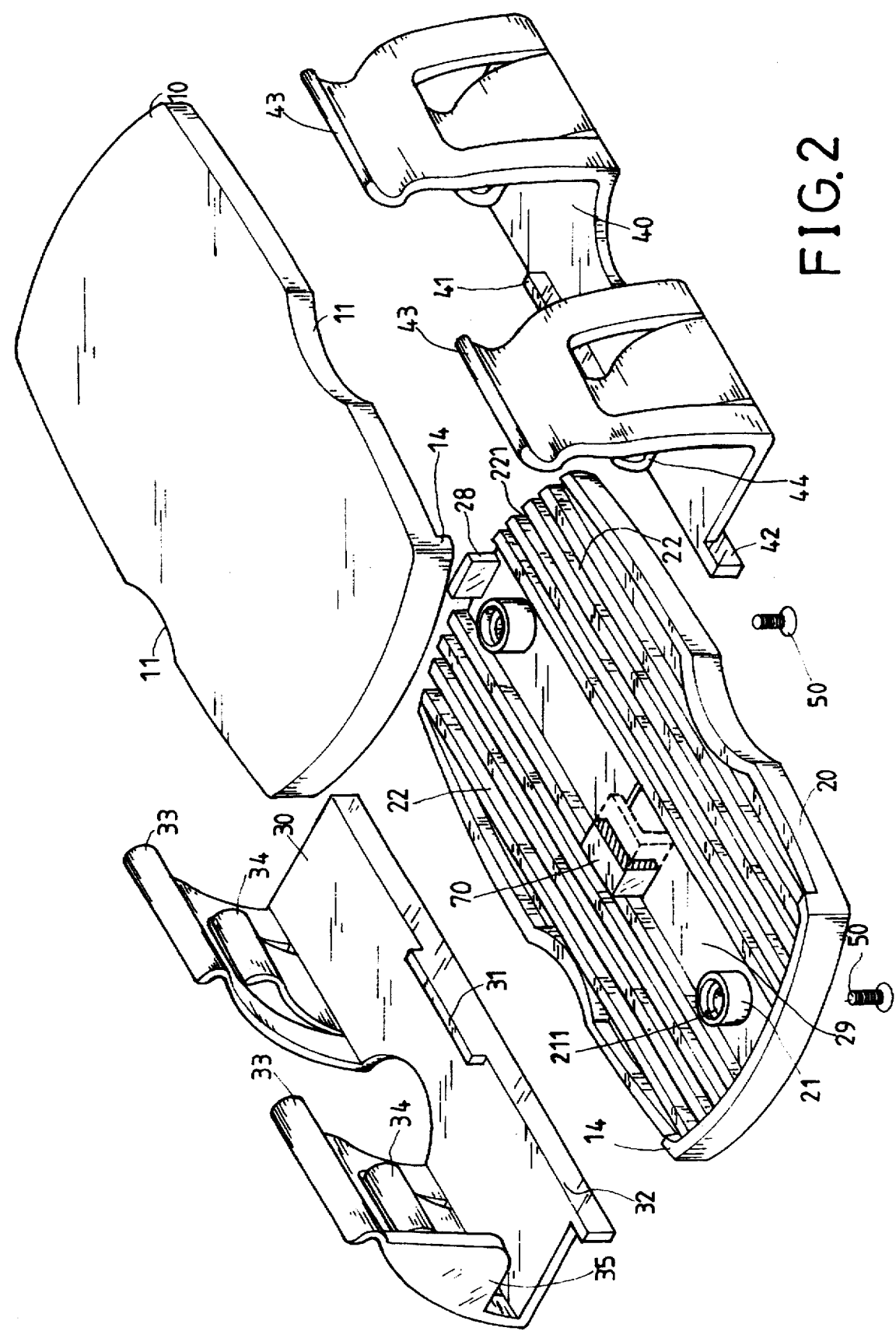
FIG. 2 is an exploded perspective view of the mobile phone holder of the present invention.
Figure 3:
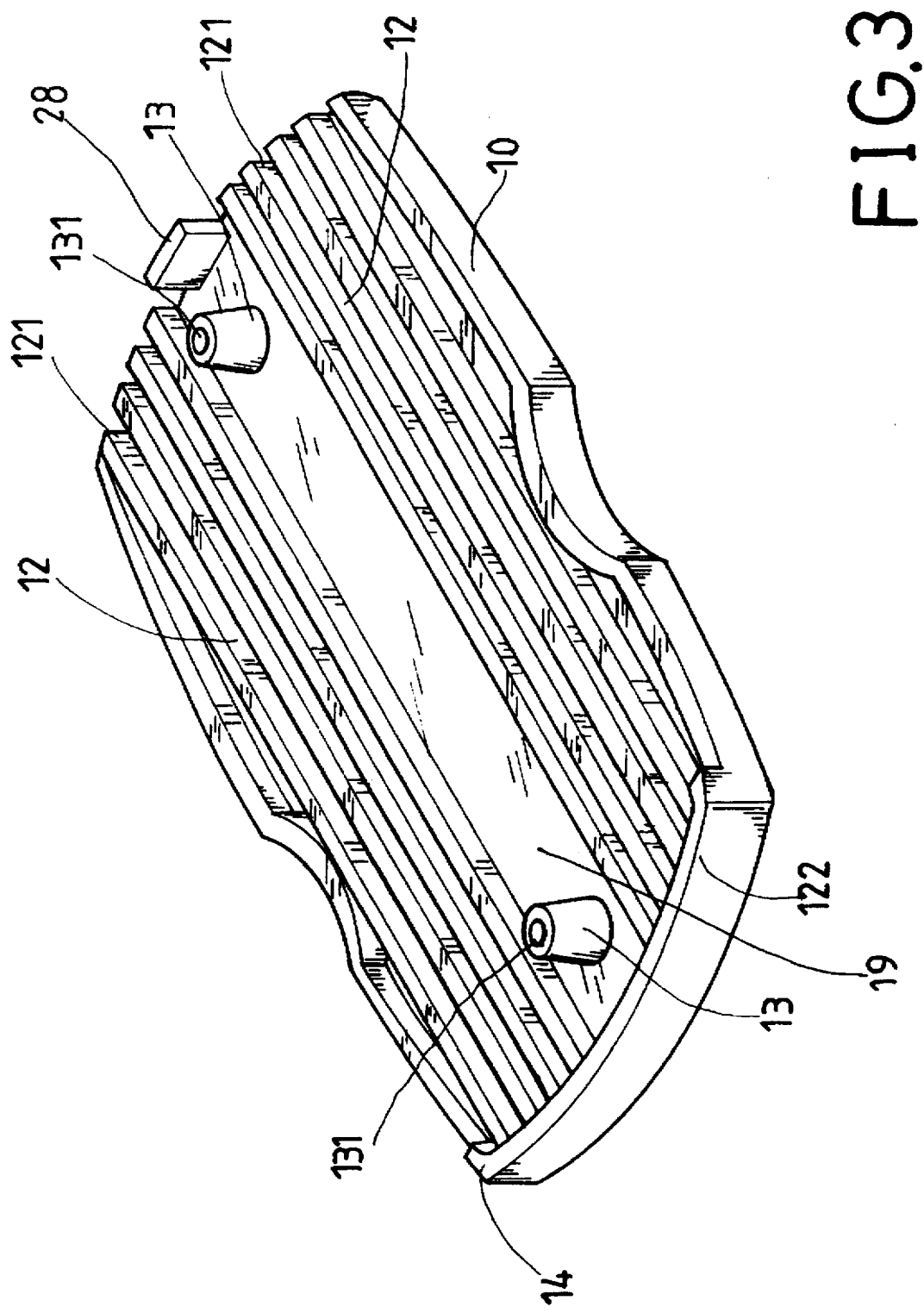
FIG. 3 is a perspective view of the upper casing of the mobile phone holder of the present invention viewed from the underside thereof.

Further referring to FIGS. 2 and 3, the lower casing member 20 comprises an inside surface facing the upper casing member 10, having a plurality of guiding slots 22 formed thereon to be substantially parallel with each other. Preferably, the guiding slots 22 are arranged into two groups defining therebetween a central slot 29 preferably with the two groups of guiding slots 22 symmetric to each other with respect to the central slot 29.

Referring to FIG. 3, similar to the lower casing member 20, the upper casing member 10 also has a plurality of guiding slots 12 formed on an inside surface that faces the lower casing member 20 and arranged in two groups defining therebetween a central slot 19. The two groups of guiding slots 12 are symmetric with respect to the central slot 19 and opposite to the guiding slots 22 of the lower casing member 20.

Figure 4:
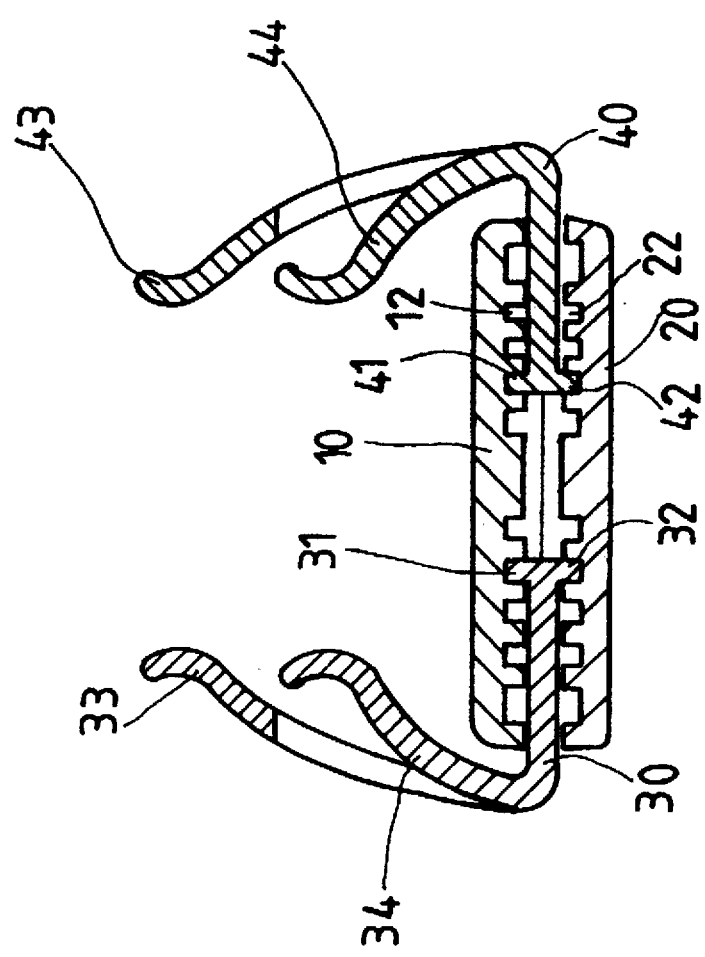
FIG. 4 is a cross-sectional view showing the mobile phone holder of the present invention.

The upper and lower casing members 10 and 20 are configured to match each other with the guiding slots 12 and 22 in alignment with each other so as to define a plurality of sliding channels (see FIG. 4). The upper and lower casing members 10 and 20 are provided with an open end 121 or 221 on one of the lateral edges of the body 90 and an opposite closed end so as to define entry openings of the sliding channels of the holder body 90.

The closed end of each of the upper and lower casing members 10 and 20 is provided with a raised wall 14 matching each other so as to leave a gap between the matched longitudinal edges of the upper and lower casing members 10 and 20, see FIG. 4. To maintain the upper and lower casing members 10 and 20 to separate from each other at the longitudinal edges, both the upper and lower casing members 10 and 20 are provided with a support tab 28 on the inside surface at the open end to match each other which, in combination with the raised walls 14, provides a uniform opening slot extending along each of the longitudinal edges of the body 90.

The upper casing member 10 is also provided with a plurality of dwell pins 13, for example two in the embodiment illustrated, located on the inside surface thereof and within the central slot 19 and correspondingly, the lower casing member 20 has a plurality of receiving elements 21 formed on the inside surface and within the central slot 29 for receiving therein the dwell pins 13 so as to provide a precise positioning of the upper casing member 10 relative to the lower casing member 20. Bolt holes 131 and 211 may be provided on the dwell pins 13 and the receiving elements 21 for receiving therein bolts 50 to secure the upper and lower casing members 10 and 20 together, thus defining the body 90.

Each of the two clamp members 30 and 40 comprises a flat plate member having a lateral edge on which a strip-like lower segment 32 or 42 and a strip-like upper segment 31 or 41 are formed which are configured to be selectively slidably receivable within one of the sliding channels of the body 90 defined by the guiding slots 12 and 22 of the upper and lower casing members, via the entry openings defined by the open ends 121 and 221 of the upper and lower casing member 30 and 40, with the flat plate member of the clamp members 30 and 40 sliding through the longitudinal edges opening slots of the body 90. This is illustrated in FIG. 4. The selective engagement of the strip-like segments 31, 32 and 41, 42 of the clamp members 30 and 40 with the sliding channels of the body 90 allows the clamp members 30 and 40 to adjust their locations relative to the body 90 and thus change the distance between the clamp members 30 and 40 in which the mobile phone 60 is received. This provides the size adjustability of the mobile phone holder 100 of the present invention.

The closed end of the upper and lower casing members 10 and 20, together with the raised walls 14, define a stop for the sliding movement of the clamp members 10 and 20 relative to the body 90.

Each of the clamp members 30 and 40 is provided with a plurality of holding sections 33 or 43, for example two in the embodiment illustrated, at a lateral edge opposite to the strip-like segments 31, 32 or 41, 42. The holding sections 33 or 43 have a root end fixed to the flat plate member of the upper and lower casing members 30 or 40 in a substantially perpendicular manner so that the holding sections 33 of the clamp member 30 are opposite to the corresponding holding sections 43 of the clamp member 40 to define therebetween the distance for receiving and holding the mobile phone 60. The holding sections 33 and 43 of the clamp members 30 and 40 also have a free end opposite to the root end and configured as an arc extending toward each other so as to have the distance between the clamp members 30 and 40 gradually reduced from the largest value at the root end of the holding sections 33 and 43 toward the smallest value at the free end of the holding sections 33 and 43. The holding sections 33 and 43 are made resilient so that when cooperating with the reducing distance between the holding sections 33 and 43 serve to tightly clamp or hold the mobile phone 60 therebetween.

In addition to the holdings sections 33 and 43, each of the clamp members 30 and 40 may be further provided with a plurality of second, resilient holding sections 34 and 44, for example two in the embodiment illustrated and in registry with the first holding sections 33 and 43 as shown. Each of the second holding sections 34 and 44 has a root end fixed to the flat plate members of the clamp members 30 and 40 and a free end remote from the root end and configured as an arc so that a distance between the second holding sections 34 and 44 of the two clamp members 30 and 40 is reduced from the smallest value at the free end to the largest value at the root end.

Preferably, the second holding sections 34 and 44 are smaller in size than the first holding sections 33 and 43 and thus the free ends of the second holding sections 34 and 44 are located lower than the free ends of the first holding sections 33 and 43 so as to allow the free ends of the second holding sections 43 and 44 to be adapted to engage and hold a mobile phone of reduced thicknesses, as compared to what can be held by the first holding sections 33 and 43.

A stop plate 35 may be provided on one end of at least one of the clamp members, for example clamp member 30 as illustrated, for maintaining the mobile phone 60 that is received between the clamp members 30 and 40 in position.

The longitudinal edges of the body 90 may be provided with a recess or notch 11 for user's hand holding. Further, hanging or fastening means, for example in the form of a hook 70 (FIG. 2) may be provided on the lower casing member 20 for attaching the mobile phone holder 100 to an external holding member or device.

Those skilled in the art will readily recognize that various and sundry modifications of the mobile phone holder of the present invention may be made. Accordingly the embodiment illustrated and discussed herein should be understood to be exemplary only in nature and the scope of the instant invention should be limited only by that of the following claims.

What is claimed is:

1. A mobile phone holder comprising: a body having a first opening slot defined along a first longitudinal edge and a second opening slot defined along a second longitudinal edge;

first and second clamp members, each of said clamp members comprising a flat plate member having a strip-like section formed on an edge and a first set of resilient holding members formed on an opposite edge, each holding member of said first set being a substantially vertical extension of said flat plate member and having a free holding end;

a first group of sliding channels defined within said body, each of said first group of sliding channels having an entry opening formed at a lateral edge of said body and a closed end formed at an opposite lateral edge of said body, wherein the strip-like section of said first clamp member is slidably received within a selected sliding channel of said first group and the first set of holding members of said first clamp member extend through said first opening slot out of said body with free holding ends being bent inward; and a second group of sliding channels defined within said body, each of said second group of sliding channels having an entry opening formed at said lateral edge of said body and a closed end formed at said opposite lateral edge of said body, wherein the strip-like section of said second clamp member is slidably received within a selected sliding channel of said second group and the first set of holding members of said second clamp member extend through said second opening slot out of said body with free holding ends being bent inward;

wherein the respective first sets of holding members of said first and second clamp members face each other and form a space for receiving and holding therein a mobile phone, the size of said space being adjustable by selecting different sliding channels for said first and second clamp members.

2. The mobile phone holder as claimed in claim 1, wherein each of the first sets of holding members of said clamp members is configured as an arc.

3. The mobile phone holder as claimed in claim 1, wherein a stop plate is further provided on at least one of said clamp members for positioning the mobile phone between said clamp members.

4. The mobile phone holder as claimed in claim 1, wherein each of said clamp members further comprises a second set of resilient holding members each having a free holding end being bent inward, said second set of holding members being smaller than said first set of holding members and the respective second sets of said first and second clamp members facing each other and forming a space smaller than the space formed by said first sets.

5. The mobile phone holder as claimed in claim 1, wherein the body further has a notch formed on each of said first and second longitudinal edges thereof.

6. The mobile phone holder as claimed in claim 1, wherein the body further comprises an upper member and a lower member each having an inside surface facing each other and a plurality of guiding slots formed thereon in a substantially parallel manner, each of said guiding slots having an open end and an opposite closed end, said upper and lower members being configured to match each other for defining the body and said first and second groups of sliding channels being defined by said guiding slots.

7. The mobile phone holder as claimed in claim 6, wherein said upper member is provided with dwell pins on the inside surface thereof for being received within receiving elements formed on the inside surface of said lower member.

8. The mobile phone holder as claimed in claim 6, wherein said upper and lower members are provided with bolt holes through which bolts are received for securing said upper and lower members together.

9. The mobile phone holder as claimed in claim 6, wherein each of said upper and lower members has a raised wall formed on the closed end of said guiding slots and a support tab formed on the open end of said guiding slots, said raised wall and said support tab separating said upper and lower members from each other along said first and second longitudinal edges for defining said first and second opening slots when said upper and lower members are secured together.

10. The mobile phone holder as claimed in claim 6, wherein the strip-like section of each of said clamp members comprises an upper segment slidably receivable within the guiding slots of said upper member and a lower segment slidably receivable within the guiding slots of said lower member.

* * * * *